(12) United States Patent
Kim et al.

(10) Patent No.: US 11,654,809 B2
(45) Date of Patent: May 23, 2023

(54) ARMREST ASSEMBLY FOR VEHICLE AND DOOR ASSEMBLY HAVING SLIDABLE ARMREST FOR VEHICLE

(71) Applicants: Hyundai Motor Company, Seoul (KR); Kia Corporation, Seoul (KR); Seoyon E-Hwa Co., Ltd., Anyang-si (KR)

(72) Inventors: Do-Won Kim, Seoul (KR); Yong-Kyun Lee, Anyang-si (KR)

(73) Assignees: Hyundai Motor Company, Seoul (KR); Kia Corporation, Seoul (KR); Seoyon E-Hwa Co., Ltd., Anyang-si (KR)

( * ) Notice: Subject to any disclaimer, the term of this patent is extended or adjusted under 35 U.S.C. 154(b) by 0 days.

(21) Appl. No.: 17/532,709

(22) Filed: Nov. 22, 2021

(65) Prior Publication Data
US 2022/0227208 A1    Jul. 21, 2022

(30) Foreign Application Priority Data

Jan. 19, 2021   (KR) .......................... 10-2021-0007307

(51) Int. Cl.
*B60N 2/75*     (2018.01)
*B60J 5/04*     (2006.01)

(52) U.S. Cl.
CPC .............. *B60N 2/78* (2018.02); *B60J 5/0493* (2013.01); *B60N 2/773* (2018.02); *B60J 5/048* (2013.01); *B60J 5/0463* (2013.01)

(58) Field of Classification Search
CPC .......... B60J 5/0493; B60N 2/75; B60N 2/773; B60N 2/777; B60N 2/78; B60N 2/793

USPC ........................................................ 296/153
See application file for complete search history.

(56) References Cited

U.S. PATENT DOCUMENTS

| | | | |
|---|---|---|---|
| 5,800,004 A * | 9/1998 | Ackeret | B60R 7/12 296/37.13 |
| 6,116,672 A * | 9/2000 | Cannon | B60R 7/046 224/547 |
| 8,511,733 B2 * | 8/2013 | Blackmore | B60R 7/04 224/544 |
| 10,195,925 B2 * | 2/2019 | Thomas | E05B 83/28 |
| 10,464,493 B2 * | 11/2019 | Dunham | B60R 7/046 |
| 10,543,794 B2 * | 1/2020 | Fitzpatrick | B60N 2/767 |
| 10,549,656 B2 * | 2/2020 | Fitzpatrick | B60R 13/0243 |
| 11,192,488 B2 * | 12/2021 | Takahashi | B60J 5/04 |
| 2009/0079228 A1 * | 3/2009 | Sturt | B60N 2/793 296/153 |
| 2012/0133168 A1 * | 5/2012 | Ardigo | B60N 3/026 296/1.02 |

(Continued)

FOREIGN PATENT DOCUMENTS

EP    1798110 A1 *  6/2007  .............. B60R 7/12
KR    100783900 B1   12/2007

*Primary Examiner* — Jason S Morrow
(74) *Attorney, Agent, or Firm* — Slater Matsil, LLP (57) ABSTRACT

A door assembly includes a door panel including a metallic plate material, a lower trim attached to the door panel, and an armrest installed on top of the lower trim and configured to be slidable in a longitudinal direction of a vehicle. The door assembly further includes a base fixedly installed on the top of the lower trim, a slider positioned on top of the base, wherein the armrest is coupled to a top of the slider, and a guide fixedly installed on the base and configured to penetrate the slider.

20 Claims, 9 Drawing Sheets

(56) References Cited

U.S. PATENT DOCUMENTS

| | | | |
|---|---|---|---|
| 2015/0203006 A1* | 7/2015 | Hipshier | B60N 2/78 296/153 |
| 2020/0079297 A1* | 3/2020 | Dominguez Cuevas | B60R 13/0243 |
| 2022/0118830 A1* | 4/2022 | Shimizu | B60N 2/78 |

* cited by examiner

ARMREST ASSEMBLY FOR VEHICLE AND DOOR ASSEMBLY HAVING SLIDABLE ARMREST FOR VEHICLE

CROSS-REFERENCE TO RELATED APPLICATIONS

This application claims the benefit of Korean Patent Application No. 10-2021-0007307, filed on Jan. 19, 2021, which application is hereby incorporated herein by reference.

TECHNICAL FIELD

The present disclosure relates to an armrest assembly for a vehicle and to a door assembly having a slidable armrest for a vehicle.

BACKGROUND

Figure 1:
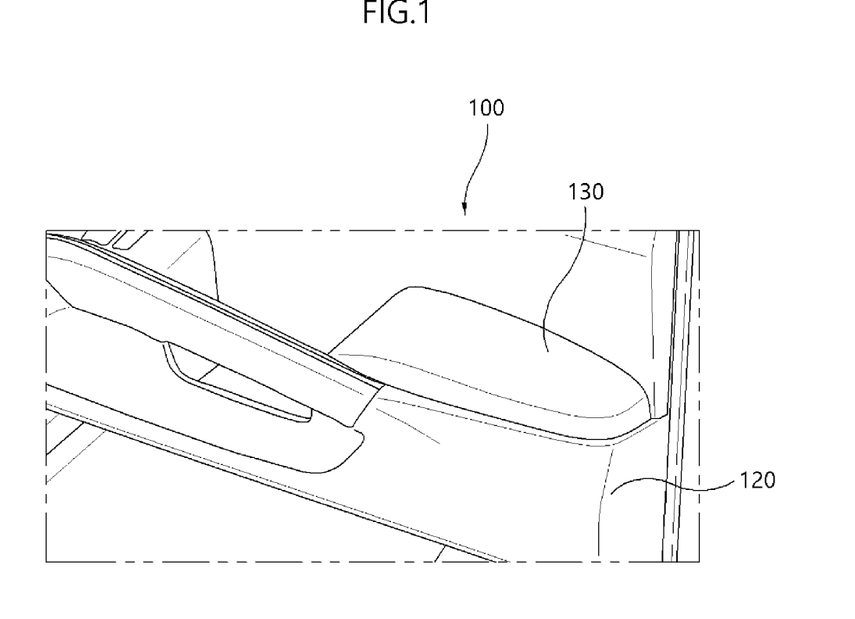
FIG. 1 is a perspective diagram illustrating a door assembly according to the related art.

FIG. 1 illustrates an example of a door assembly for a vehicle.

Such a door assembly 100 forms a structure using a door panel such as an inner panel or an outer panel, and is finished by attaching a door trim to the door panel.

A lower trim 120 of the door trim is provided with an armrest 130 for supporting the passenger's arm or elbow, and the armrest 130 is fixedly installed at a predetermined position, such that there is inconvenience in that the passenger may not move the armrest 130 to his/her desired position.

Meanwhile, an idle space exists between the door trim and the door panel, but is not provided with a configuration of opening and closing a part of the door trim, such that it is not possible to use the idle space.

The contents described in this section are to help the understanding of the background of the present disclosure, and may include what is not previously known to those skilled in the art to which the present disclosure pertains.

SUMMARY

The present disclosure relates to an armrest assembly for a vehicle and to a door assembly having a slidable armrest for a vehicle. Particular embodiments relate to a door assembly installed on one side of a vehicle through which a passenger gets on and off, and to a door assembly having a slidable armrest for a vehicle, which may allow a passenger to slide the armrest and adjust a position of the armrest so as to fit the passenger's body.

The present disclosure can solve problems in the art, and an embodiment of the present disclosure provides an armrest assembly for a vehicle and a door assembly having a slidable armrest for a vehicle, which may allow a passenger to adjust an armrest to his/her desired position so as to fit a passenger's body.

Another embodiment of the present disclosure provides an armrest assembly for a vehicle and a door assembly having a slidable armrest for a vehicle, which may store items such as an umbrella inside a trim of a door.

A door assembly having a slidable armrest for a vehicle according to embodiments of the present disclosure includes a door panel made of a metallic plate material to form a structure, a lower trim finished by being attached to the door panel, and an armrest for supporting a passenger's arm installed on the top of the lower trim to be slidable in the front and back direction of the vehicle.

The door assembly having the slidable armrest for the vehicle further includes a base fixedly installed on the top of the lower trim, a slider positioned on the top of the base and having the armrest coupled to the top thereof, and a guide fixedly installed on the base and penetrating the slider.

A guide groove is formed in the slider in the longitudinal direction of the vehicle, and the guide penetrates the guide groove, such that the base and the slider are coupled.

The slider is formed with an inner rail having an outward curved portion curved outward from the slider and an inward curved portion curved inward from the slider, which are alternately formed consecutively in the longitudinal direction of the vehicle, and the guide is formed with a convex portion in which both side ends of the guide are in contact with the outward curved portion.

A radius of the convex portion is formed to be smaller than a radius of the outward curved portion.

A width of a portion of the guide, which is formed with the convex portion, is formed to be larger than a width of a portion of the slider, which is formed with the outward curved portion to overlap with each other by a predetermined range.

A width of a portion formed with the inner rail is formed to be larger than a width of the guide groove.

The convex portion is formed on a portion of the guide, which is adjacent to the front end of the guide.

A contact portion in which each of both side ends of the guide is in contact with the inward curved portion of the inner rail is formed on the rear of the convex portion.

The door assembly having the slidable armrest for the vehicle further includes a case for storing an item inside the lower trim, in which an outlet through which the item is drawn out is formed on the upper end of the case and opened and closed by the armrest.

A sliding displacement of the armrest is formed to be larger than a diameter of the outlet.

Meanwhile, a door assembly having a slidable armrest for a vehicle according to embodiments of the present disclosure includes a door panel, a lower trim attached to the inside of the door panel, an armrest slidably installed on the lower trim, and a case installed between the door panel and the lower trim and for storing an item therein, in which when the armrest slides to the front of the vehicle, an outlet formed on the upper end of the case is open, and when the armrest slides to the rear of the vehicle, the outlet is closed.

The case is disposed in a direction perpendicular to a direction in which the armrest slides.

The armrest assembly for the vehicle and the door assembly having the slidable armrest for the vehicle according to embodiments of the present disclosure having the above configuration may allow the passenger to move the armrest to his/her desired position to support the arm or the elbow, thereby improving the comfort of the passenger.

Further, it is possible to adjust and then maintain the position of the armrest, thereby stably supporting the passenger's arm.

Further, it is possible to store the items such as an umbrella using the space between the door trim and the door panel, which is the idle space to store the items at the predetermined position, thereby improving the indoor habitability.

DETAILED DESCRIPTION OF ILLUSTRATIVE EMBODIMENTS

Hereinafter, an armrest assembly for a vehicle and a door assembly having a slidable armrest for a vehicle according to embodiments of the present disclosure will be described in detail with reference to the accompanying drawings.

As illustrated in FIGS. 2-8, a door assembly 1 having a slidable armrest for a vehicle according to embodiments of the present disclosure includes an armrest 30 for supporting a passenger's arm and installed on the top of a lower trim 20 to be slidable in the front and back direction of the vehicle, in the door assembly having a door panel 10 made of a metallic plate material to form a structure and the lower trim 20 finished by being attached to the bottom of the door panel 10.

Figure 2:
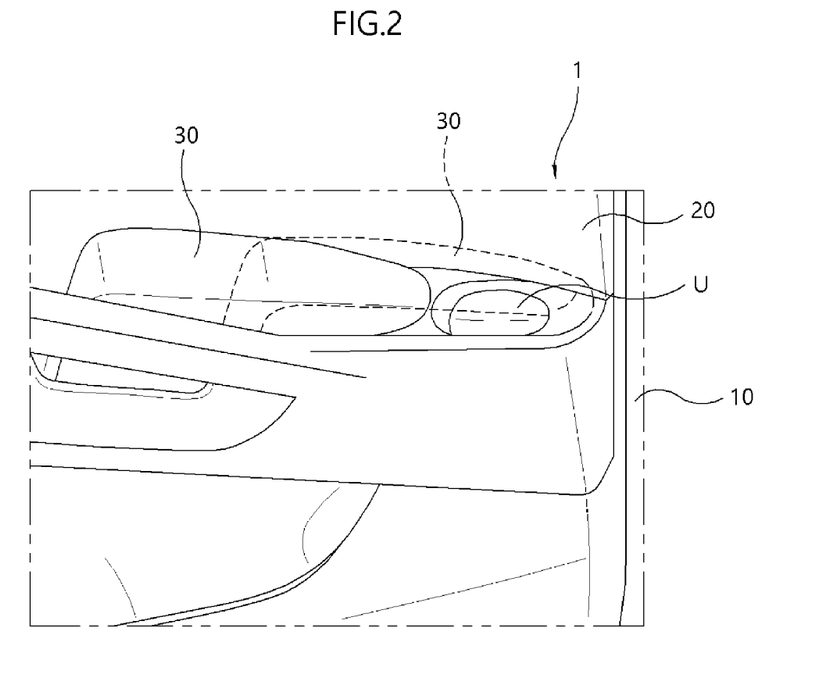
FIG. 2 is a perspective diagram illustrating a door assembly having a slidable armrest for a vehicle according to embodiments of the present disclosure.

The door assembly 1 includes the door panel 10 such as an inner panel or an outer panel, and a door trim for finishing the outside of the door panel 10.

Generally, the door panel 10 processes the plate made of a metallic material to form a structure of the door assembly 1. According to embodiments of the present disclosure, the door panel 10 may become the inner panel.

The door trim is attached to the outside of the indoor side of the vehicle in the door panel 10. The door trim includes a portion exposed to the indoor side of the vehicle in the door assembly 1, and becomes the portion covering the door panel 10 and various instruments and wirings mounted on the door panel 10, and is in direct contact with the passenger.

Particularly, according to embodiments of the present disclosure, the door trim preferably becomes the lower trim 20 attached to the bottom of the door assembly 1.

The armrest 30 is installed on the top of the lower trim 20 to be slidable in the longitudinal direction of the vehicle. Since the armrest 30 is slidable, the passenger may adjust the armrest 30 to his/her desired position, thereby supporting the passenger's arm or elbow more comfortably.

Figure 5:
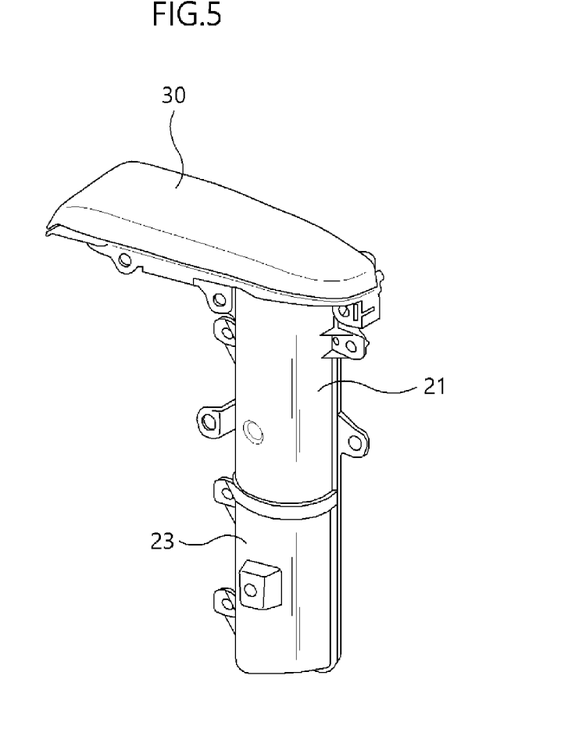
FIG. 5 is a perspective diagram illustrating a state where a door panel and a trim are removed from the door assembly having the slidable armrest for the vehicle according to embodiments of the present disclosure.

In order for the armrest 30 to be slidable in the lower trim 20, a base 40, a slider 31, and a guide 41 are provided therein.

The base 40 is installed on the top of the lower trim 20 in a fixed state, the slider 31 is slidably installed on the base 40, and the armrest 30 is coupled to the top of the slider 31. The guide 41 is fixedly installed on the base 40 and penetrates the slider 31, and the armrest 30 is coupled to the slider 31, such that the armrest 30 is slidable in the lower trim 20.

Figure 6:
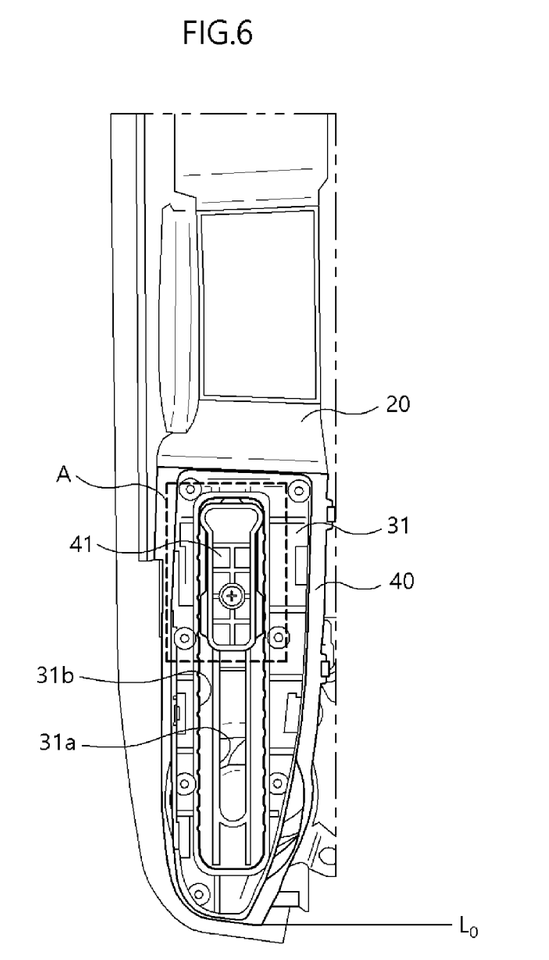
FIG. 6 is a plan diagram illustrating a state before the armrest slides in the door assembly having the slidable armrest for the vehicle according to embodiments of the present disclosure.

That is, a guide groove 31a is formed in the slider 31 in the longitudinal direction of the vehicle, and the guide 41 penetrates the guide groove 31a and the guide 41 and the slider 31 are coupled, such that the slider 31 slides with respect to the base 40 and the guide 41 and thus the armrest 30 slides with respect to the lower trim 20.

Figure 8:
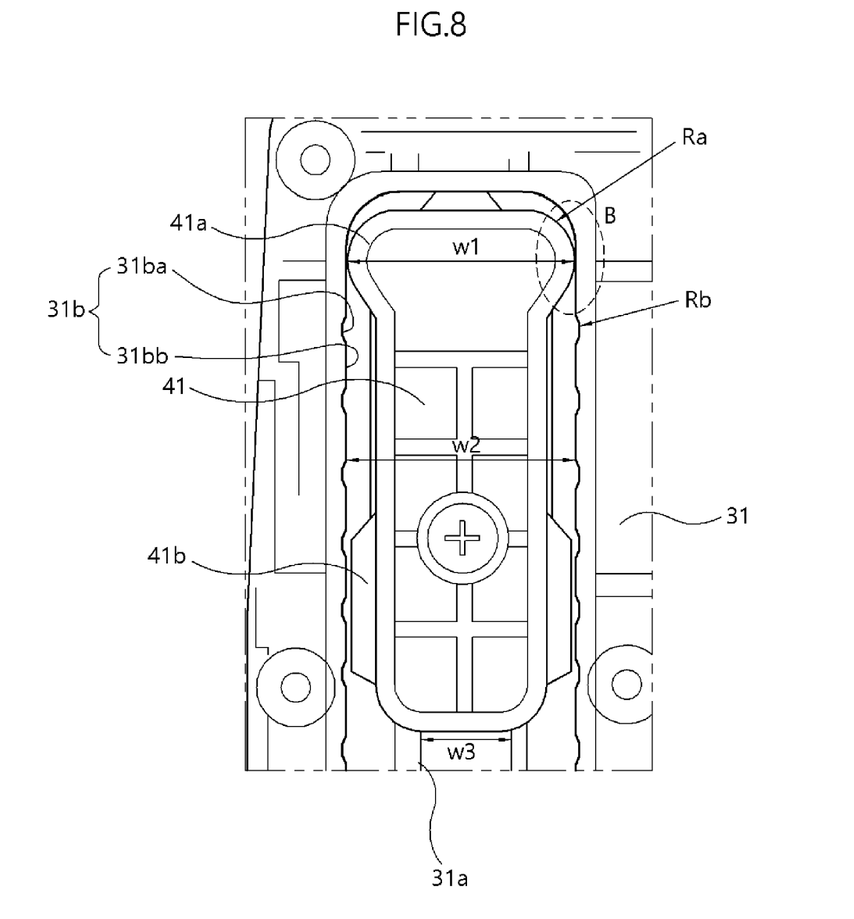
FIG. 8 is an enlarged diagram of a portion A illustrated in FIG. 6.

The guide groove 31a is formed with a predetermined width w3 in the longitudinal direction of the vehicle, and the guide 41 penetrates the guide groove 31a to be fixedly installed on the lower trim 20, such that the slider 31 and the armrest 30 are slidable in the longitudinal direction of the vehicle.

Meanwhile, to give a feeling of operation when the passenger slides the armrest 30, a convex portion 41a may be formed on the guide 41, and an inner rail 31b may be formed in the slider 31.

A groove is formed in the slider 31 to be stepped with the guide groove 31a, and the inner rail 31b is formed in the inner side surface of the groove. The inner rail 31b has an outward curved portion 31ba, which is curved outward from the slider 31, and an inward curved portion 31bb, which is curved inward from the slider 31, alternately formed consecutively in the longitudinal direction of the vehicle so as to give a feeling of operation when the slider slides. The inner rail 31b has the outward curved portion 31ba and the inward curved portion 31bb formed alternately, and the convex portion 41a relatively moves in contact with the inner rail 31b.

At this time, to give the appropriate operability without left and right clearance when the slider 31 slides, a width w1 of a portion of the guide 41, which is formed with the convex portion 41a, is formed to be larger than a width w2 of a portion of the slider 31, which is formed with the outward curved portion 31ba (w1>w2) to be formed to overlap with each other by a predetermined range (a portion B illustrated in FIG. 8).

Further, a radius Ra of the convex portion 41a is formed to be smaller than a radius Rb of the outward curved portion 31ba.

The radius Ra of the convex portion 41a is formed to be smaller than the radius Rb of the outward curved portion 31ba, such that when the slider 31 slides, the convex portion 41a is positioned inside the outward curved portion 31ba. The convex portion 41a may be alternately in contact with the outward curved portion 31ba and the inward curved portion 31bb when the slider 31 slides, and may stop at only the portion formed with the outward curved portion 31ba, such that the passenger may feel a feeling of operation upon operation.

An example of the radius Ra of the convex portion 41a, the radius Rb of the outward curved portion 31ba, and an amount of overlap of the convex portion 41a and the outward curved portion 31ba is expressed in Table 1 below.

TABLE 1

Embodiment of the radius of the convex portion, the radius of the outward curved portion, and an amount of overlap of the convex portion and the outward curved portion.

| | Ra (unit: mm) | Rb (unit: mm) | Overlap (unit: mm) | Operability |
|---|---|---|---|---|
| Comparative example 1 | 7.0 | 10.0 | 0.3 | Occurrence of left and right clearance |
| Comparative example 2 | 7.5 | 10.5 | 0.4 | Good |
| Comparative example 3 | 8.0 | 11.0 | 0.5 | Good |
| Comparative example 4 | 8.5 | 11.5 | 0.6 | Heavy operability |

Therefore, it may be seen that it is preferable that the radius Ra of the convex portion 41a is 7.5 mm to 8 mm, and the radius Rb of the outward curved portion 31ba is 10.5 mm to 11 mm.

Further, an amount of overlap of the guide 41 and the outward curved portion 31ba is preferably 0.4 mm to 0.5 mm.

The convex portion 41a may be formed on a portion of the guide 41, which is adjacent to the front end of the guide 41.

Since the convex portion 41a is positioned on the front of the guide 41, a clearance may be generated on the rear of the guide 41, thus, a contact portion 41b is formed on the guide 41. The contact portion 41b is formed such that each of both side ends of the guide 41 are in contact with the inward curved portion 31bb of the inner rail 31b on the rear of the convex portion 4a.

A width w2 of a portion formed with the inner rail 31b is formed to be larger than a width w3 of the guide groove 3a, thereby preventing the slider 31 from being separated from the guide 41.

Figure 3:
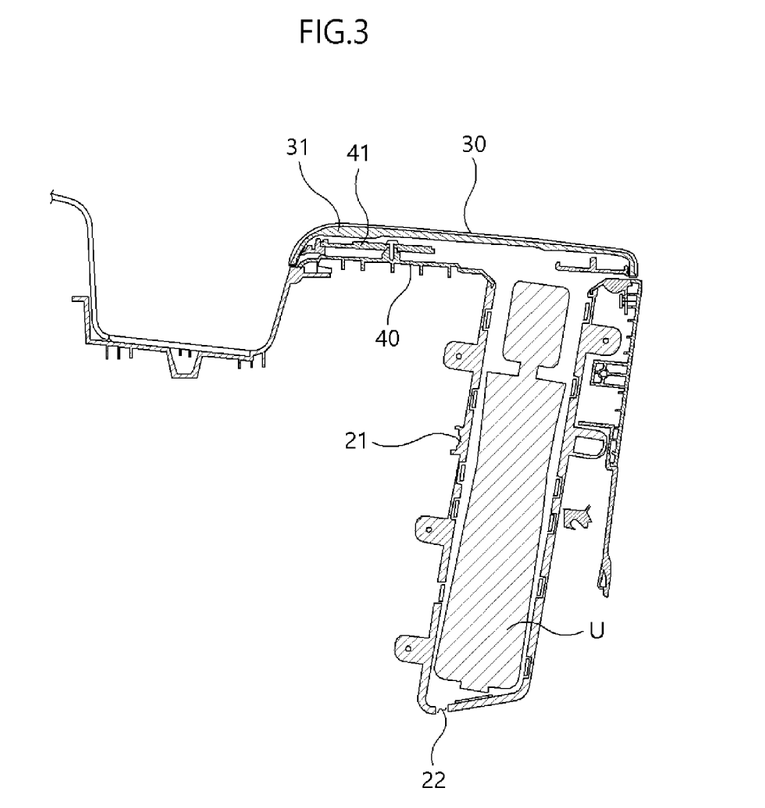
FIG. 3 is a cross-sectional diagram illustrating the door assembly having the slidable armrest for the vehicle according to embodiments of the present disclosure.

Meanwhile, items such as an umbrella U may be stored in the idle space between the door panel 10 and the door trim. The present exemplary embodiment will be described using an umbrella U as an example of the item.

A case 21 is formed as a space capable of storing the umbrella U therein. The case 21 is installed between the door panel 10 and the door trim. Particularly, since an interval between the lower trim 20 and the door panel 10 is large, the case 21 is preferably installed between the lower trim 20 and the door panel 10.

Here, the case 21 is installed in the height direction of the door assembly 1 such that moisture easily flows downward between the door panel 10 and the lower trim 20.

Figure 4:
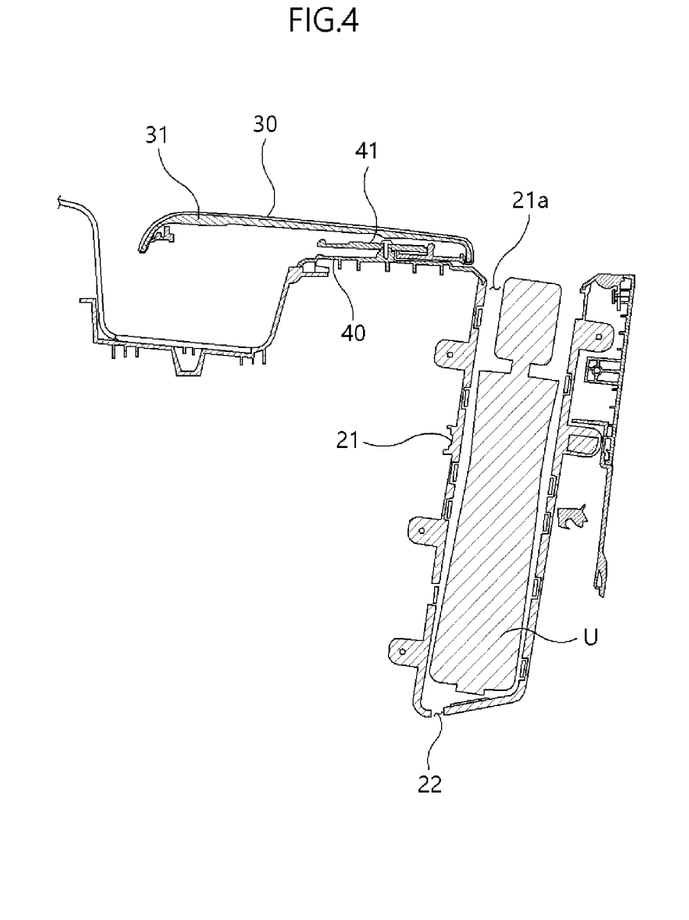
FIG. 4 is a cross-sectional diagram illustrating a state where an armrest is open in the door assembly having the slidable armrest for the vehicle according to embodiments of the present disclosure.
Figure 7:
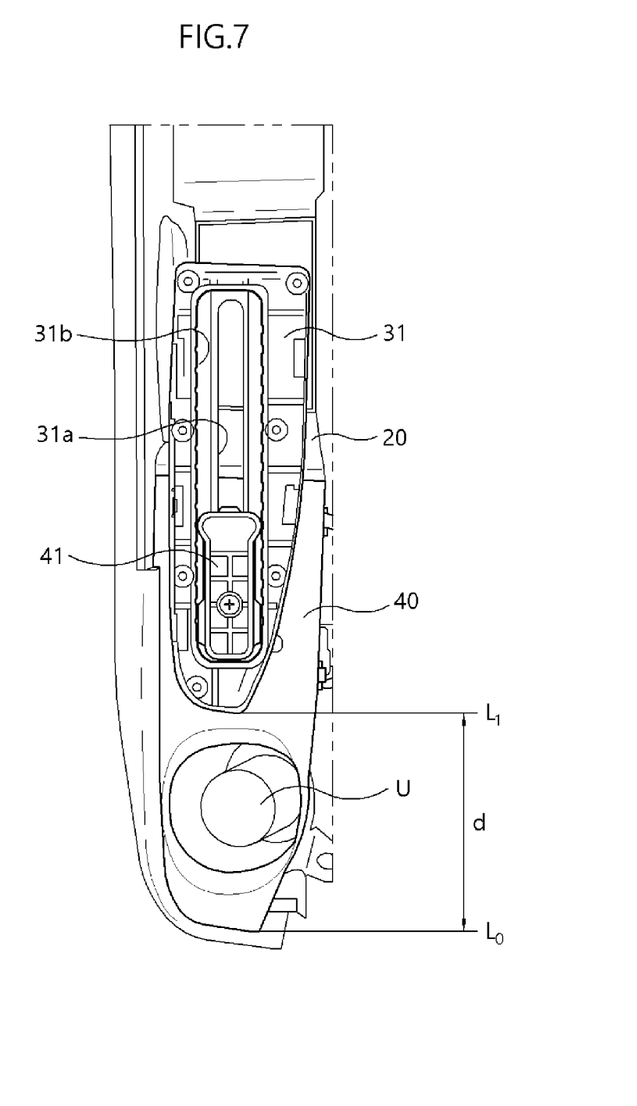
FIG. 7 is a plan diagram illustrating a state where the armrest slides forward in the door assembly having the slidable armrest for the vehicle according to embodiments of the present disclosure.
Figure 9:
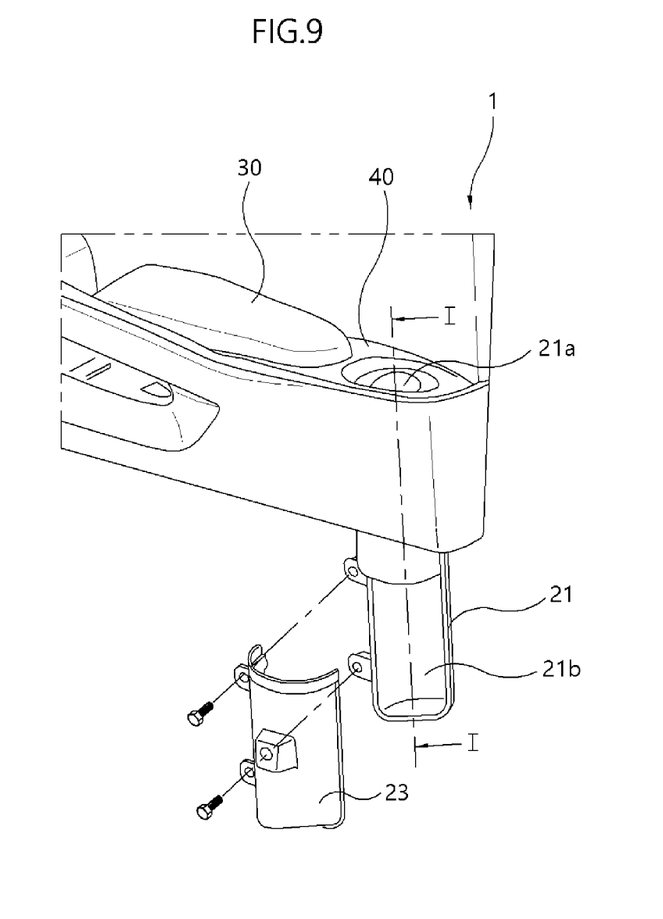
FIG. 9 is a perspective diagram illustrating a state where a cover is separated from the door assembly having the slidable armrest for the vehicle according to embodiments of the present disclosure.

The upper end of the case 21 is open to become an outlet 21a through which the umbrella U is drawn out. A displacement d at which the armrest 30 slides is formed to be larger than the diameter of the outlet 21a. As illustrated in FIGS. 6 and 7, the armrest 30 has the displacement d from $L_0$ to $L_1$ and when the armrest 30 maximally slides backward from the vehicle ($L_0$ illustrated in FIG. 6), the outlet 21a is fully closed, and when the armrest 30 maximally slides forward from the vehicle ($L_1$ illustrated in FIG. 7), the outlet 21a is fully opened. FIG. 3, cross-sectional diagram taken along the line I-I illustrated in FIG. 9, illustrates a state where the umbrella U is stored inside the case 21, and FIG. 4 illustrates a state where the armrest 30 moves forward and the umbrella U is stored inside the case 21.

One side of the case 21 is formed with a cover fastening portion 21b in the form with a part of the case 21 cut. Through the cover fastening portion 21b, the inside of the case 21 has an opened structure, such that through the cover fastening portion 21b as necessary, the inside of the case 21 may be cleaned, or foreign matters may be removed. Here, the cover fastening portion 21b is preferably formed on the bottom of the case 21.

A drain 22 for drainage is formed on the lower end of the case 21.

A cover 23 is fixed to the case 21.

What is claimed is:

1. A door assembly comprising:
   a door panel comprising a metallic plate material;
   a lower trim attached to the door panel;
   an armrest installed on top of the lower trim and configured to be slidable in a longitudinal direction of a vehicle,
   a base fixedly installed on the top of the lower trim;
   a slider positioned on top of the base, wherein the armrest is coupled to a top of the slider; and
   a guide fixedly installed on the base and configured to penetrate the slider.

2. The door assembly of claim 1, wherein a guide groove is formed in the slider in the longitudinal direction of the vehicle, and the guide is configured to penetrate the guide groove to couple the base and the slider.

3. The door assembly of claim 1, further comprising:
   a case configured to store an item inside the lower trim; and
   an outlet on an upper end of the case, wherein the outlet is configured to allow passage of the item and is configured to be opened and closed based on a position of the armrest.

4. The door assembly of claim 3, wherein a sliding displacement of the armrest is larger than a diameter of the outlet.

5. A door assembly comprising:
   a door panel comprising a metallic plate material;
   a lower trim attached to the door panel;
   a base fixedly installed on top of the lower trim;
   a slider positioned on top of the base, wherein the slider includes an inner rail having at least one outward curved portion curved outward from the slider and at least one inward curved portion curved inward from the slider, wherein the outward curved portion and the inward curved portion alternate consecutively in a longitudinal direction of a vehicle;
   a guide groove formed in the slider in the longitudinal direction of the vehicle;
   a guide fixedly installed on the base, wherein the guide is configured to penetrate the slider and to penetrate the guide groove to couple the base and the slider, and wherein the guide includes a convex portion in which both side ends of the guide are in contact with the outward curved portion of the slider; and
   an armrest installed on top of the lower trim and coupled to a top of the slider, wherein the armrest is configured to be slidable in the longitudinal direction of the vehicle.

6. The door assembly of claim 5, wherein a radius of the convex portion is smaller than a radius of the outward curved portion.

7. The door assembly of claim 5, wherein a width of a portion of the guide formed with the convex portion is larger than a width of a portion of the slider formed with the outward curved portion to overlap with each other by a predetermined range.

8. The door assembly of claim 5, wherein a width of a portion of the guide formed with the inner rail is larger than a width of the guide groove.

9. The door assembly of claim 5, wherein the convex portion is formed on a portion of the guide that is adjacent to a front end of the guide.

10. The door assembly of claim 5, wherein a contact portion at which each of both side ends of the guide is in contact with the inward curved portion of the inner rail is formed on a rear of the convex portion.

11. A vehicle comprising:
a vehicle body;
a door panel coupled to the vehicle body;
a lower trim attached to an inside of the door panel;
an armrest slidably installed on the lower trim; and
a case installed between the door panel and the lower trim, wherein when the armrest is in a forward position, an outlet on an upper end of the case is open, and when the armrest is in a rearward position, the outlet is closed.

12. The vehicle of claim 11, wherein the case is disposed in a direction perpendicular to a direction in which the armrest is configured to slide.

13. The vehicle of claim 11, wherein the case is configured to store an item therein.

14. The vehicle of claim 11, wherein a sliding displacement of the armrest is larger than a diameter of the outlet.

15. The vehicle of claim 11, further comprising:
a base fixedly installed on top of the lower trim;
a slider positioned on top of the base, wherein the armrest is coupled to a top of the slider; and
a guide fixedly installed on the base and configured to penetrate the slider.

16. The vehicle of claim 15, wherein a guide groove is formed in the slider in a longitudinal direction of the vehicle, and the guide is configured to penetrate the guide groove to couple the base and the slider.

17. The vehicle of claim 16, wherein:
the slider includes an inner rail having at least one outward curved portion curved outward from the slider and at least one inward curved portion curved inward from the slider, wherein the outward curved portion and the inward curved portion alternate consecutively in the longitudinal direction of the vehicle; and
the guide includes a convex portion in which both side ends of the guide are in contact with the outward curved portion of the slider.

18. The vehicle of claim 17, wherein a radius of the convex portion is smaller than a radius of the outward curved portion.

19. The vehicle of claim 17, wherein a width of a portion of the guide formed with the convex portion is larger than a width of a portion of the slider formed with the outward curved portion to overlap with each other by a predetermined range.

20. The door assembly of claim 3, wherein a guide groove is formed in the slider in the longitudinal direction of the vehicle, and the guide is configured to penetrate the guide groove to couple the base and the slider.

* * * * *